United States Patent
Jeon et al.

(10) Patent No.: US 10,586,252 B2
(45) Date of Patent: Mar. 10, 2020

(54) SELECTING CONTENT FOR PRESENTATION TO A GROUP OF ONLINE SYSTEM USERS BASED ON TEMPORAL, SPATIAL, INTEREST, AND PURPOSE INFORMATION OF THE GROUP

(71) Applicant: Facebook, Inc., Menlo Park, CA (US)

(72) Inventors: Sung-eok Jeon, Bellevue, WA (US); Aliasgar Mumtaz Husain, Miliptas, CA (US)

(73) Assignee: Facebook, Inc., Menlo Park, CA (US)

( * ) Notice: Subject to any disclaimer, the term of this patent is extended or adjusted under 35 U.S.C. 154(b) by 436 days.

(21) Appl. No.: 15/150,288

(22) Filed: May 9, 2016

(65) Prior Publication Data
US 2017/0323340 A1    Nov. 9, 2017

(51) Int. Cl.
| | | |
|---|---|---|
| *G06Q 30/00* | (2012.01) | |
| *G06Q 30/02* | (2012.01) | |
| *H04L 29/08* | (2006.01) | |
| *G06N 20/00* | (2019.01) | |

(52) U.S. Cl.
CPC ......... *G06Q 30/0261* (2013.01); *G06N 20/00* (2019.01); *G06Q 30/0275* (2013.01); *G06Q 30/0277* (2013.01); *H04L 67/02* (2013.01); *H04L 67/18* (2013.01); *H04L 67/20* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2011/0246306 A1* | 10/2011 | Blackhurst | G06Q 30/02 705/14.58 |
| 2015/0142551 A1* | 5/2015 | Papakipos | G06Q 30/0277 705/14.41 |
| 2016/0232580 A1* | 8/2016 | Baluja | G06Q 30/0255 |
| 2019/0251584 A1* | 8/2019 | Boinodiris | G06Q 30/0205 |

* cited by examiner

*Primary Examiner* — Alvin L Brown
(74) *Attorney, Agent, or Firm* — Fenwick & West LLP (57) ABSTRACT

An online system identifies a group of users of the online system based on connections between the users of the group maintained by the online system and distances between the users during a particular time interval. The online system predicts a purpose of the group and one or more common interests shared by users of the group. The predicted purpose and common interest(s) are mapped to content items eligible to be presented to one or more users of the group. A confidence score and/or bid price is computed for each content item to which the purpose and common interest(s) of the group are mapped. The online system selects one or more content items for presentation to one or more users of the group based on the confidence scores/bid prices.

23 Claims, 3 Drawing Sheets

SELECTING CONTENT FOR PRESENTATION TO A GROUP OF ONLINE SYSTEM USERS BASED ON TEMPORAL, SPATIAL, INTEREST, AND PURPOSE INFORMATION OF THE GROUP

BACKGROUND

This disclosure relates generally to online systems, and more specifically to selecting content for presentation to users of an online system.

An online system allows its users to connect and communicate with other online system users. Users create profiles on the online system that are tied to their identities and include information about the users, such as interests and demographic information. The users may be individuals or entities such as corporations or charities. Because of the popularity of online systems and the significant amount of user-specific information maintained by online systems, an online system is in a unique position to leverage information in its possession to select content for presentation to its users that is likely to be relevant to the users. For example, if a user has provided profile information indicating that the user has an interest in restoring classic cars, the online system may select a content item including an image of a restored classic car for presentation to the user based on the user's profile information and information stored in association with the content item indicating its contents. Content items are selected for presentation to various users by the online system to encourage users to interact with the online system. By increasing user engagement with the online system, the online system also increases the number of opportunities it has to generate revenue (e.g., by presenting advertisements to its users).

Conventionally, online systems select content items for presentation to online system users based on targeting criteria associated with content items identifying characteristics of online system users who are eligible to be presented with the content items. For example, if a content item is associated with targeting criteria identifying one or more characteristics of users who are eligible to be presented with the content item, the online system identifies users of the online system having at least a threshold number of the characteristics identified by the targeting criteria as eligible to be presented with the content item and does not present the content item to users that do not have at least the threshold number of characteristics specified by the targeting criteria. User characteristics specified by targeting criteria may include information associated with individual users, such as demographic information, connections between users and other users, actions performed by a user, interests of the user, etc.

However, targeting criteria associated with content items typically do not account for the fact that the relevance of content items to users may change when the users form a group that has gathered for a particular purpose, at a particular time and location. For example, a user that works full-time and never watches movies alone is much more likely to find an advertisement for a new movie to be relevant when the user is meeting with a group of friends near a movie theater on a weekend. Thus, conventional online systems may present content items to users that are not relevant or may miss opportunities to present relevant content items to users due to their failure to account for changes in the relevance of content items to users in group settings.

SUMMARY

An online system identifies a group of users of the online system and selects content items (e.g., advertisements) for presentation to one or more users of the group based on a purpose and a common interest shared by the users of the group. The online system may identify the group based on connections between the users of the group maintained by the online system and distances between the users during a particular time interval. For example, the online system identifies a group of users of the online system based on connections between the users in the online system and based on geographic locations of client devices of each user that are within a threshold distance of 100 feet of each other for a time interval that is at least 30 minutes in duration. In some embodiments, the connections between the users may be determined based on information retrieved or received from an additional online system (e.g., a third party system). The online system may identify users of the group based on criteria that vary based on information specific to the users. For example, the threshold distance between users of a group may be shorter for users located in urban areas than for suburban and rural areas.

Once the group has been identified, the online system may predict the purpose of the group. Examples of purposes of a group include celebrating an occasion (e.g., a birthday or a wedding), going on a date or on a family outing (e.g., to a restaurant or to a theme park), attending a business lunch, going camping with friends, etc. In one embodiment, the online system computes values indicating confidence levels associated with different predetermined purposes maintained by the online system, where a value indicates a confidence level that the corresponding purpose is the purpose of the group; the purpose of the group is then predicted based on the values. For example, the online system computes a value for each of multiple predetermined purposes maintained by the online system and predicts that the purpose of the group is the purpose associated with the value indicating the highest confidence level.

The online system may predict the purpose of the group in various ways. In one embodiment, the online system predicts the purpose of the group based on contextual information (e.g., the location of the group, the time of day during which the group is at the location, holidays and birthdays of users of the group that are approaching, etc.) and information maintained by the online system (e.g., profile information, information describing actions previously performed by users of the group, information stored in association with connections between users of the group indicating the nature of the relationship(s) between the users, etc.). For example, if a group of users is at a park on a summer weekend at noon and information stored in association with connections between the users indicates the users are family members, the online system may predict that the purpose of the group is to go on a family picnic. As an additional example, based on information stored in profiles of users of a group indicating that the users are employees of the same company and based on the group's location at a restaurant for at least 20 minutes on an evening close to the end of the year, the online system predicts that the purpose of the group is to attend a holiday party for the company. In yet another example, the online system predicts the purpose of a group at a gym on a Saturday morning to be to attend a weekly workout session with friends based on connections between the users of the group indicating the users are friends, profile information of the users that include fitness as an interest, and information describing historical visits of the users to the same gym every Saturday morning. In some embodiments, the purpose of the group is predicted based on information obtained directly from a user of the group. For example, the purpose of a group is predicted based on information posted by a user of the group to the online system during the time interval that was used to identify the group. The online system may predict the purpose of the group using a machine-learned model. For example, a machine-learned model ranks the most likely purposes of the group based on information describing purposes of similar groups provided directly by users of the groups (e.g., via surveys) and predicts the purpose of the group to be the highest ranked purpose.

In addition to predicting the purpose of the group, the online system may also predict one or more common interests shared by users of the group. The common interests may be predicted by the online system based on information maintained by the online system associated with the users, such as historical interactions of the users with content maintained by the online system. For example, the online system may predict an interest shared by users of the group based on content for which the users previously expressed a preference, based on content the users previously shared with additional online system users, and/or based on content on which the users previously commented. The online system may also predict a common interest of users of the group based on profile information associated with the users. For example, the online system determines that users of a group that share a hobby of painting likely share a common interest in art. In one embodiment, the online system may use a machine-learned model to predict a common interest of users of the group. The online system may also compute a value indicating a confidence level with which a common interest of users of the group was predicted. For example, a value indicating a confidence level of a prediction that a common interest of users of a group is playing video games is higher if the prediction is based on profile information explicitly shared by the users (e.g., hobbies that include playing video games) than if the prediction is based on a few content items related to video games viewed by some of the users of the group.

Once the online system has predicted the purpose of the group and a common interest shared amongst users of the group, the online system selects candidate content items that may be presented to one or more users of the group. The online system maps the purpose and common interest associated with the group to content items that may be presented to one or more users of the group and selects the content items to which the purpose and common interest are mapped as candidate content items. The mapping may be based on targeting criteria describing users of the online system that are likely to be interested in the content items. In some embodiments, the purpose and common interest associated with a group are mapped to a content item (e.g., an advertisement) based on targeting criteria associated with the content item (e.g., provided by an advertiser), where the targeting criteria have at least a threshold similarity to the purpose and common interest. For example, if the online system predicts that the purpose of a group is rock climbing and that the users of the group share a common interest in camping, the interest and purpose are mapped to an advertisement for a sporting goods store targeted to users who are interested in sports and the outdoors. In some embodiments, the mapping is based on one or more roles associated with users of the group. For example, if a group identified by the online system is a group of coworkers, roles in the group may include managers and employees. In the previous example, an advertisement for a printer may be mapped to the interest and purpose of the managers based on their roles as managers (e.g., advertising increased productivity and cost savings) and an additional advertisement for the printer may be mapped to the interest and purpose of the employees based on their roles as employees (e.g., advertising various printing features and ease of use). In some embodiments, a machine-learned model is used to map the purpose and common interest of the group to content items. For example, if a machine-learned model is trained based on information indicating that an advertisement for a movie theater almost never receives interaction from parents with children younger than 2-years-old, the machine-learned model does not map the purpose and interest of groups including parents with children younger than 2-years-old to the advertisement.

To select one or more candidate content items to present to a group or one or more users of the group, the online system computes a confidence score or a bid price for each candidate content item to which the purpose and common interest of the group were mapped and selects one or more candidate content items to present based on the scores/bid prices. The score or bid price for a candidate content item may be computed based on weights associated with different types of interests and different types of purposes associated with both the group and the candidate content item. For example, the online system computes a bid price for an advertisement for a jewelry store based on different weights associated with interests in different types of jewelry (e.g., earrings, watches, different jewelry brands, etc.) and different weights associated with different purposes relevant to the advertisement (e.g., buying jewelry as a gift or for oneself), where the weights are provided by an advertiser. Furthermore, in the previous example, the bid price may also be computed based on different weights based on confidence levels of predicted interests of a user of the group in the different types of jewelry and a weight based on a confidence level of a predicted purpose of the group that corresponds to a purpose relevant to the advertisement. Once the online system has computed a confidence score/bid price for the candidate content items, the online system selects one or more candidate content items to present to the group or one or more users of the group based on the score/bid price. For example, the online system ranks candidate content items based on their associated confidence scores and selects two of the highest ranked candidate content items for presentation to a user of the group. As an additional example, the online system ranks advertisements based on their associated bid prices and selects advertisements associated with at least a threshold bid price for presentation to the users of the group.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
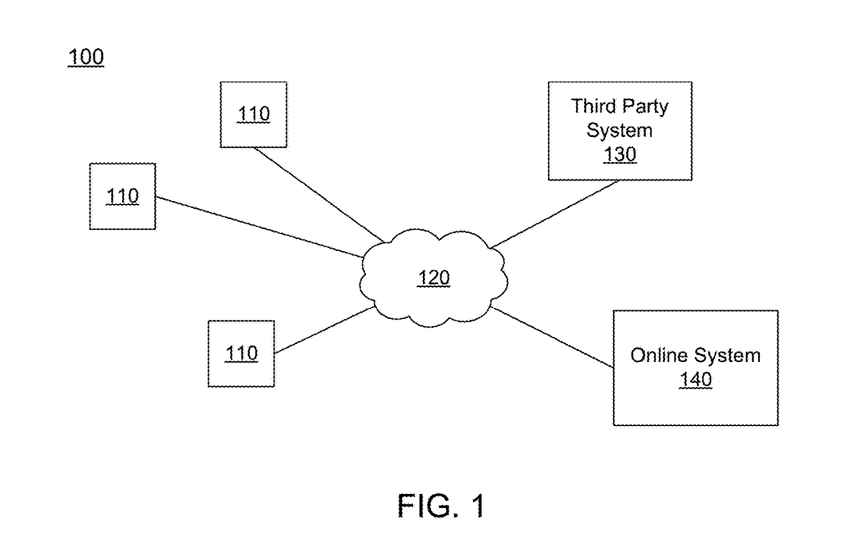
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third party systems 130, and the online system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The online system 140 may receive information describing locations of users of the online system 140 from client devices 110 associated with the users. Location information describing locations of online system users include geographic coordinates, place identifiers (e.g., store name, street address, etc.), or other information suitable for identifying a physical location. Location information may also include various attributes of the locations, such as types of connections to a network (e.g., BLUETOOTH®, 802.11, global positioning system, etc.) available from a location, identifiers of wireless access points within a threshold distance of the location, identifiers of cellular phone towers within a threshold distance of the location, or other suitable information. For example, location information describing a client device location includes a type of network connection available at the location for transmitting information from a client device 110 to the online system 140.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Figure 2:
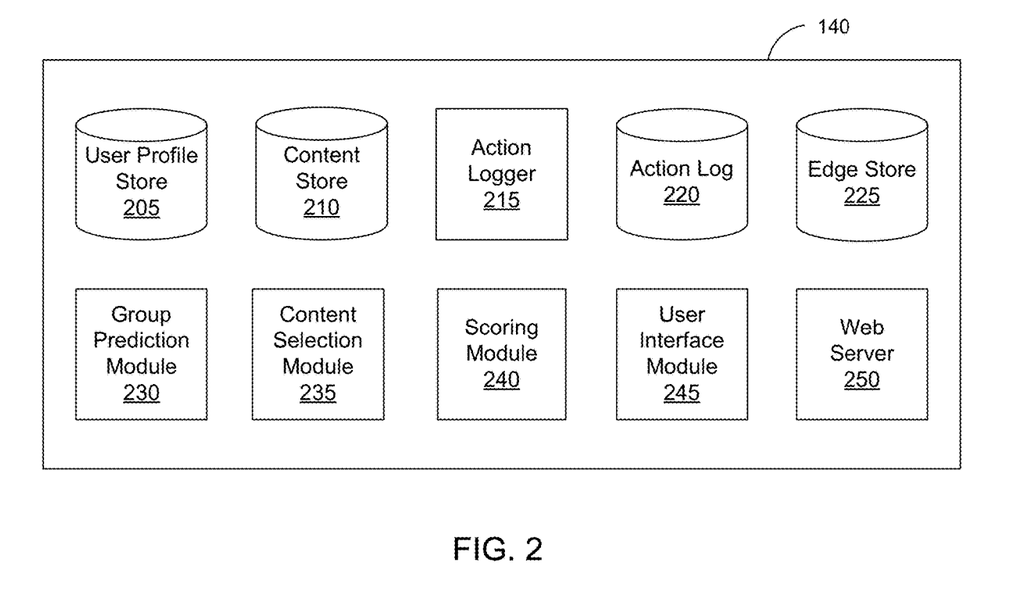
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a group prediction module 230, a content selection module 235, a scoring module 240, a user interface module 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on the third party system 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 for storing in the action log 220 by the application for recordation and association with the user by the social networking system 140.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group prediction module 230 identifies a group of users of the online system 140. Users of the group may be identified based on connections between the users maintained by the online system 140 and distances between the users during a particular time interval. In some embodiments, the group prediction module 230 identifies a group of users based on a set of criteria or rules describing the connections between the users, a threshold distance between the users, and a time interval during which users must be within a threshold distance of each other. For example, the group prediction module 230 identifies users of the online system 140 as a group if the users have established connections between each other in the online system 140 and the geographic locations of client devices 110 of the users are within a threshold distance of 50 feet of each other during a time interval that is of at least a threshold duration (e.g., 30 minutes). As an additional example, each user of a group must be directly connected to at least one additional user of the group or indirectly connected to at least a threshold number or percentage of additional users of the group to be identified as a user of the group.

One or more rules or criteria used by the group prediction module 230 to identify a group of users may vary based on information associated with one or more users of the group. For example, the threshold distance is shorter for users in office and apartment buildings than for users in parks and fields. As an additional example, on a workday, the threshold amount of time during which users of a group must be within a threshold distance of each other to be identified as a group is shorter than on weekends. In some embodiments, the connections between the users may be identified based on information retrieved or received from an additional online system, such as a third party system 130.

The group prediction module 230 may predict a purpose of a group it has identified. Examples of purposes that the group prediction module 230 may predict for a group include attending a celebration (e.g., a birthday party or wedding), going on a date, going on a family outing (e.g., to a restaurant or to see a movie), attending a business meeting, going shopping with friends, etc. The purpose of a group may be predicted based on information obtained directly from a user of the group. For example, the purpose of the group is predicted based on information posted in a check-in by a user of the group, where the check-in was posted during the time interval that was used to identify the group. As an additional example, the purpose of a group is predicted based on answers to a survey that is sent to users of the group, where questions in the survey are directed to the purpose of the group. The purpose of a group may also be predicted based on contextual information, such as the location of the group (e.g., in a restaurant or a theater) and a time during which the group is at the location (e.g., on a weekend or weekday; during the morning, afternoon, or night; or within a threshold amount of time of a holiday or birthday of a user of the group).

Furthermore, information maintained by the online system 140 may also be used to predict the purpose of a group (e.g., profile information, historical actions performed by users of the group, information stored in association with connections between users of the group, etc.). For example, if a group of users is at a theater on a summer weekend afternoon and information stored in association with connections between the users indicates the users are family members, the group prediction module 230 may determine that the purpose of the group is to see a family movie. As an additional example, based on information stored in profiles of users of a group indicating that the users are a dating couple and based on the group's location at a restaurant for at least 20 minutes on Valentine's Day, the group prediction module 230 determines that the purpose of the group is to celebrate Valentine's Day. In some embodiments, the group prediction module 230 predicts the purpose of a group using a machine-learned model. For example, when predicting the purpose of the group, a machine-learned model ranks certain purposes higher for the group based on previous purposes determined for groups including the same or similar users at a similar place and time.

The group prediction module 230 may compute a value indicating a confidence level associated with the predicted purpose of a group. For example, if a group of family members is at a home of one of the family members on a Saturday night, the group prediction module 230 computes a higher value indicating a confidence level of a prediction that the purpose of the group is to eat dinner with family if previous check-ins by users included in the group indicate that the group traditionally eats at the same home every Saturday night than if the prediction was made without the check-in information. As an additional example, if a group includes two users associated with information maintained by the online system 140 indicating the users are dating, the group prediction module 230 computes a value indicating a level of confidence in a prediction that the purpose of the group is to become engaged that is proportional to the amount of time the users have been dating. In one embodiment, the group prediction module 230 predicts the purpose of the group by selecting the most likely purpose of the group from a set of predetermined purposes maintained by the online system 140 based on values indicating confidence levels computed for each predetermined purpose. For example, the group prediction module 230 computes a value for each of a set of predetermined purposes maintained by the online system 140 that includes skiing and snowboarding, where the value indicates a confidence level that the corresponding purpose is the purpose of the group; the group prediction module 230 then predicts that the purpose of the group is skiing if skiing is associated with the value indicating the highest confidence level.

The group prediction module 230 also predicts one or more common interests of users of a group. The common interests of users of the group may be predicted based on information maintained by the online system 140 associated with the users such as historical interactions of the users with content maintained by the online system 140 (e.g., based on content for which the users previously expressed a preference, based on content the users previously shared with additional online system users, and based on content on which the users previously commented). The common interests of users of the group may also be predicted based on profile information associated with the users (e.g., hobbies or interests). For example, the group prediction module 230 determines that users of a group that share a hobby of ballet likely share a common interest in dancing. As an additional example, the group prediction module 230 determines that users of a group that are both physicians are likely to have a common interest in their profession. In one embodiment, a machine-learned model predicts a common interest of users of the group. The group prediction module 230 may also compute a value indicating a confidence level with which a common interest of users of the group was predicted. For example, a value indicating a confidence level of a prediction that a common interest of users of a group is street hockey is higher if the prediction is based on profile information explicitly shared by the users (e.g., hobbies that include street hockey) than if the prediction is based on a few content items related to street hockey viewed by some of the users of the group. The group prediction module 230 is further described below in conjunction with FIGS. 3 and 4.

The content selection module 235 determines candidate content items that may be presented to one or more users of the group. Content items eligible for presentation to a user of the group are retrieved from the content store 210 or from another source by the content selection module 235. A content item eligible for presentation to the user is a content item associated with at least a threshold number of targeting criteria satisfied by characteristics of the user or is a content item that is not associated with targeting criteria. The content selection module 235 determines the candidate content items by mapping the purpose and common interest of the group to content items that may be presented to one or more users of the group.

In one embodiment, the purpose and common interest associated with the group are mapped to a content item based on targeting criteria associated with the content item, or based on any other suitable information associated with the content item, where the targeting criteria or information associated with the content item have at least a threshold similarity to the purpose and common interest of the group. For example, if the group prediction module 230 predicts that the purpose of a group is hiking and that the users of the group share a common interest in mountain biking, the interest and purpose are mapped to an advertisement for a sporting goods store targeted to users who are interested in sports and the outdoors and to a content item including a video captioned "camping." Each content item to which the purpose and common interest of the group are mapped is determined to be a candidate content item by the content selection module 235.

In some embodiments, the mapping is based on one or more roles associated with users of the group. For example, if a group identified by the group prediction module 230 is a family, roles in the group may include parents and children. In the previous example, an advertisement for a theme park may be mapped to the interest and purpose of the parents based on their roles as parents (e.g., advertising free admission for kids and family-friendliness) and an additional advertisement for the theme park may be mapped to the interest and purpose of the children based on their roles as children (e.g., advertising new attractions having themes based on children's novels). In some embodiments, a machine-learned model is used to map the purpose and common interest of the group to content items. For example, if a machine-learned model is trained based on information indicating that an advertisement for a restaurant receives the least interaction from high school students, the machine-learned model does not map the advertisement to groups including users between the ages of 14 and 17.

The content selection module 235 selects one or more content items (e.g., advertisements) for communication to one or more client devices 110 to be presented to the group or one or more users of the group. In various embodiments, the content selection module 235 includes the candidate content items mapped to the purpose and common interest of the group in one or more selection processes, which identify a set of content items for presentation to one or more users of the group. A selection processes may identify content items to present to users of the group based on a confidence score or bid price computed by the scoring module 240 for each content item, as described below. For example, the content selection module 235 ranks candidate content items based on their associated confidence scores and selects three of the highest ranked candidate content items for presentation to a user of the group. As an additional example, the content selection module 235 ranks advertisements based on their associated bid prices and selects advertisements associated with at least a threshold bid price for presentation to one or more users of the group. In some embodiments, the content selection module 235 ranks both candidate content items not associated with bid prices and advertisements in a unified ranking based on bid prices associated with advertisements and confidence scores associated with candidate content items. Based on the unified ranking, the content selection module 235 selects content for presentation to one or more users of the group. Selecting advertisements and other content items through a unified ranking is further described in U.S. patent application Ser. No. 13/545,266, filed on Jul. 10, 2012, which is hereby incorporated by reference in its entirety. The content selection module 235 is further described below in conjunction with FIG. 3.

The scoring module 240 computes a confidence score for each candidate content item to which the purpose and common interest of the group were mapped indicating a measure of likelihood that the content item is relevant to the group. The confidence score for a candidate content item may be computed based on weights associated with different types of interests and different types of purposes associated with both the group and the candidate content item. For example, the scoring module 240 computes a confidence score for a candidate content item including a video about dog sled racing based on different weights associated with interests in different topics associated with the candidate content item (e.g., dogs, sledding, etc.) and different weights associated with different purposes relevant to the candidate content item (e.g., assembling a dog sled racing team or training a sled dog), where the weights are provided by a user that posted the candidate content item. Furthermore, in the previous example, the confidence score may also be computed based on different weights based on confidence levels of predicted interests of a user of the group in the different topics and a weight based on a confidence level of a predicted purpose of the group that corresponds to a purpose relevant to the candidate content item. In some embodiments, the scoring module 240 computes a bid price for a candidate content item (e.g., an advertisement) based on the confidence score for the candidate content item. For example, the bid price for an advertisement is based on the confidence score computed for the advertisement, where the bid price is proportional to the confidence score. The scoring module 240 is further described below in conjunction with FIG. 3.

The user interface module 245 generates a user interface (e.g., one or more web pages) including content from the online system 140, such as images, video, profile information, or other data. The content included in the user interface may include content selected for presentation to one or more users of the group. In some embodiments, the user interface module 245 generates a user interface that includes a feed of content items (e.g., a scrollable newsfeed) including one or more content items selected by the content selection module 235 for presentation to one or more users of the group. The content items included in a feed of content items may include one or more advertisements. The order in which content items are presented in a feed of content items may be determined in part by a ranking of candidate content items by the content selection module 235, as described above. For example, if the content selection module 235 selects two of the highest ranked content items for presentation to the group, the user interface module 245 generates a newsfeed with the highest ranked content item in the most prominent position of the newsfeed and the second highest ranked content item in the second most prominent position of the newsfeed. The interface generated by the user interface module 245 may also include a separate display area in which the selected content may be presented (e.g., a pop-up window that overlays a portion of content presented by the online system 140).

The user interface generated by the user interface module 245 may also allow users of the online system 140 to communicate information to the online system 140. The user interface may include an interactive element (e.g., hyperlinked text or an image) that allows a viewing user to submit a request to the online system 140 or a third party system 130 to perform an action. For example, a user presented with a content item in the interface may share, indicate a preference for, or comment on a content item. As an additional example, a user that interacts with an advertisement presented in the interface may be redirected to a landing page on a third party website that allows the user to complete a purchase or subscribe to a service associated with the advertisement.

Once the user interface module 245 has generated the interface including the one or more content items selected for presentation to one or more users of the group, the user interface module 245 presents the interface to the users. For example, the interface is presented in a display area of one or more client devices 110 associated with the users of the group. The user interface module 245 is further described below in conjunction with FIG. 3.

The web server 250 links the online system 140 via the network 120 to the one or more client devices 110, as well as to the third party system 130 and/or one or more third party systems. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or BlackberryOS.

Selecting a Content Item for Display to an Online System User

Figure 3:
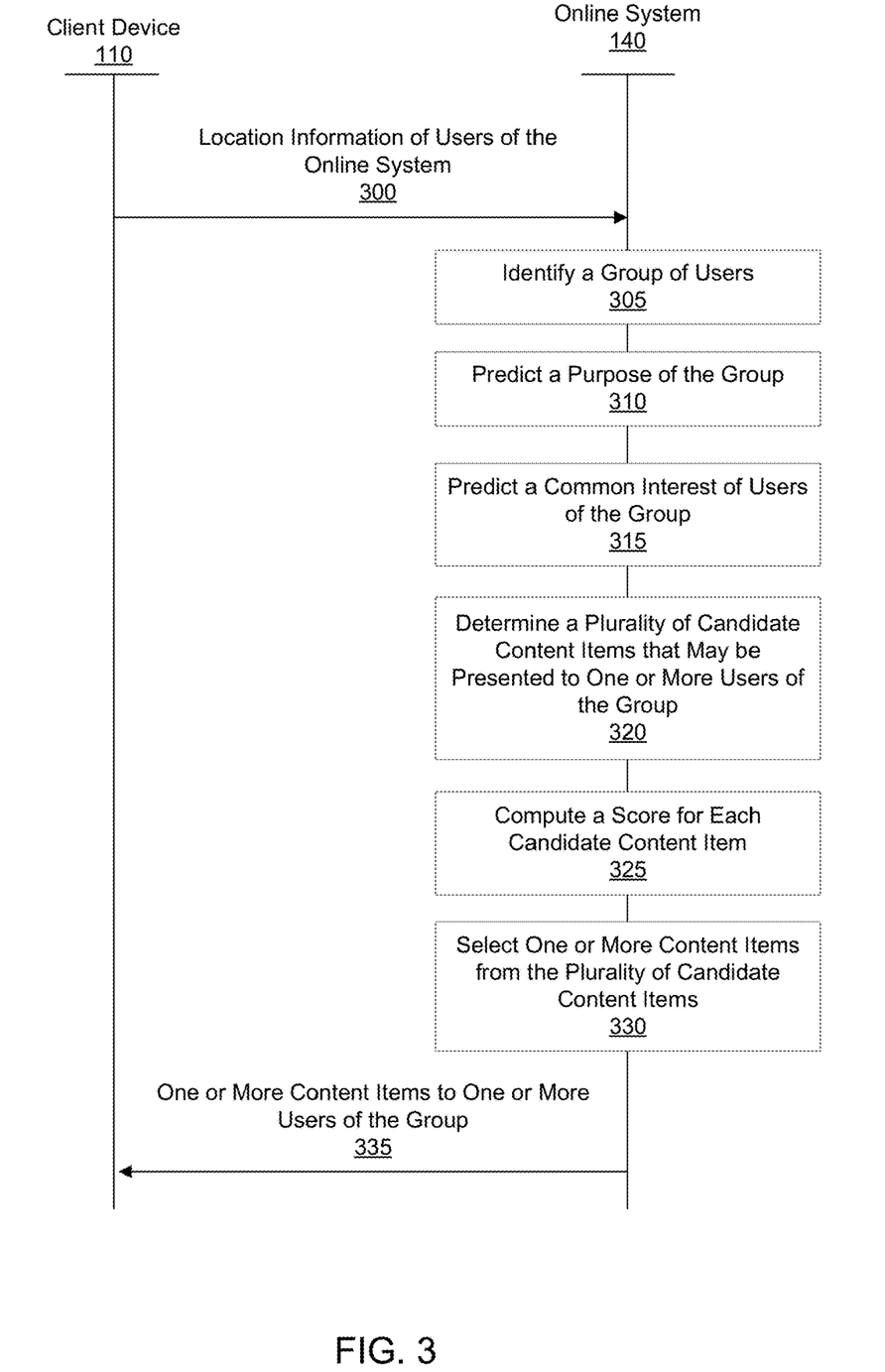
FIG. 3 is an interaction diagram of a method for selecting content for presentation to one or more users of a group of online system users, in accordance with an embodiment.

FIG. 3 is an interaction diagram of a method for selecting content for presentation to one or more users of a group of online system users according to one embodiment. In other embodiments, the method may include different and/or additional steps than those shown in FIG. 3. Additionally, steps of the method may be performed in a different order than the order described in conjunction with FIG. 3.

The online system 140 receives 300 information describing locations of users of the online system 140. The information describing locations of the users may be received 300 from client devices 110 associated with the users. The online system 140 may receive 300 information about a location of an online system user based on a location of a smartphone, tablet, or any other suitable client device 110 associated with the user. Location information describing locations of online system users include geographic coordinates, place identifiers, etc. and may include various attributes of the locations (e.g., types of connections to a network available from a location, identifiers of wireless access points within a threshold distance of the location, identifiers of cellular phone towers within a threshold distance of the location, etc.).

The group prediction module 230 may identify 305 a group of online system users based on connections between the users maintained by the online system 140 and distances between the users during a particular time interval. In some embodiments, the group prediction module 230 uses a set of criteria or rules to identify 305 the group of users. For example, if each user of a set of users of the online system 140 is directly connected to at least one additional user of the set and the geographic locations of client devices 110 associated with each of the users are within a threshold distance of 30 feet of each other for at least a threshold amount of time of 20 minutes, the group prediction module 230 identifies 305 the set of users as a group. One or more rules or criteria used by the group prediction module 230 may vary based on information associated with one or more users of the group. For example, if an online system user is a new user of the online system 140 (e.g., the user created their account on the online system 140 less than 6 months ago), the user must be directly or indirectly connected to at least one additional user of the group to be included in the identified 305 group while other users that created their online system accounts earlier must be directly connected to at least one additional user of the group to be included in the identified 305 group. As an additional example, the threshold distance is shorter for users located in a crowded city than for users located in a farming community. In some embodiments, the connections between users of the group may be identified based on information retrieved or received from an additional online system, such as a third party system 130.

Once the group prediction module 230 has identified 305 a group of online system users, the group prediction module 230 may predict 310 a purpose of the group. Examples of purposes of a group include celebrating an event or an occasion (e.g., a birthday or an anniversary), going on a trip or on a family outing (e.g., to a restaurant or to a theme park), attending a business conference, playing sports with friends, etc. For example, the group prediction module 230 predicts 310 that the purpose of the group is to celebrate a baby shower or anniversary, to have a meal with friends or family, to attend a concert, etc. The purpose of the group may be predicted 310 based on information obtained directly from a user of the group. For example, the purpose of the group is predicted 310 based on information provided by a user of the group within a threshold amount of time from the time the group was identified (e.g., in a check-in or in an answer to a questionnaire).

The purpose of the group also may be predicted 310 based on contextual information, such as the location of the group and the time during which the group is at the location. For example, if a group of two online system users is at a restaurant at night, and information stored in association with a connection between the users indicates that the users are in a relationship, the group prediction module 230 predicts 310 that the purpose of the group is to go on a date. If, however, the group in the previous example includes one or more additional users and is meeting at the same restaurant on the birthday of one of the users, the group prediction module 230 predicts 310 that the purpose of the group is to celebrate a birthday.

Additionally, the purpose of the group may be predicted 310 based on information maintained by the online system 140, such as profile information, historical actions performed by users of the group, information stored in association with connections between users of the group, etc. For example, if a group of middle-aged online system users is at a high school during an evening and information stored in association with connections between the users indicates the users are friends and information stored in their user profiles indicates that the users are all close to the same age, the group prediction module 230 may predict 310 that the purpose of the group is to attend a high school reunion. As an additional example, based on information stored in profiles of users of a group indicating that the users are classmates and based on the group's location at a library for at least 20 minutes late in the afternoon on a weekday, the group prediction module 230 predicts 310 that the purpose of the group is to study together. In yet another example, the group prediction module 230 predicts 310 the purpose of a group at an auditorium on a Saturday evening in May to be to attend a graduation for a family member based on connections between the users of the group indicating the users are family members and profile information of a user of the group that indicates that the user is a high school senior. In some embodiments, the group prediction module 230 predicts 310 the purpose of a group using a machine-learned model. For example, when predicting 310 the purpose of the group, a machine-learned model is more likely to predict 310 certain purposes based on previous purposes determined for groups including the same users or users having at least a threshold measure of similarity to users of the group at similar locations and times.

The group prediction module 230 may compute a value indicating a confidence level associated with the predicted purpose of the group. For example, if profile information associated with each user of a group of two users indicates the users are dating, the group prediction module 230 computes a value indicating a level of confidence in a prediction that the purpose of the group is to become engaged, where the value increases in proportion to the amount of time the users have been dating. As an additional example, if a group of family members is at a car dealership on a Sunday afternoon, the group prediction module 230 computes a higher value indicating a confidence level of a prediction that the purpose of the group is to purchase a car if previous check-ins by a user of the group indicated that the group visited other car dealerships every weekend during the last month than if the prediction was made without the previous check-in information. The group prediction module 230 may predict 310 the purpose of the group by selecting the most likely purpose of the group from a set of predetermined purposes maintained by the online system 140. In the previous example, if a set of predetermined purposes maintained by the online system 140 includes only shopping, having a meal, and watching a movie, and the highest value computed by the group prediction module 230 indicating a confidence level associated with a prediction is associated with the prediction that the purpose of the group is to purchase a car, the group prediction module 230 predicts 310 the purpose of the group by selecting the purpose from a list of purposes that most closely matches the purpose of the group (i.e., shopping).

Figure 4:
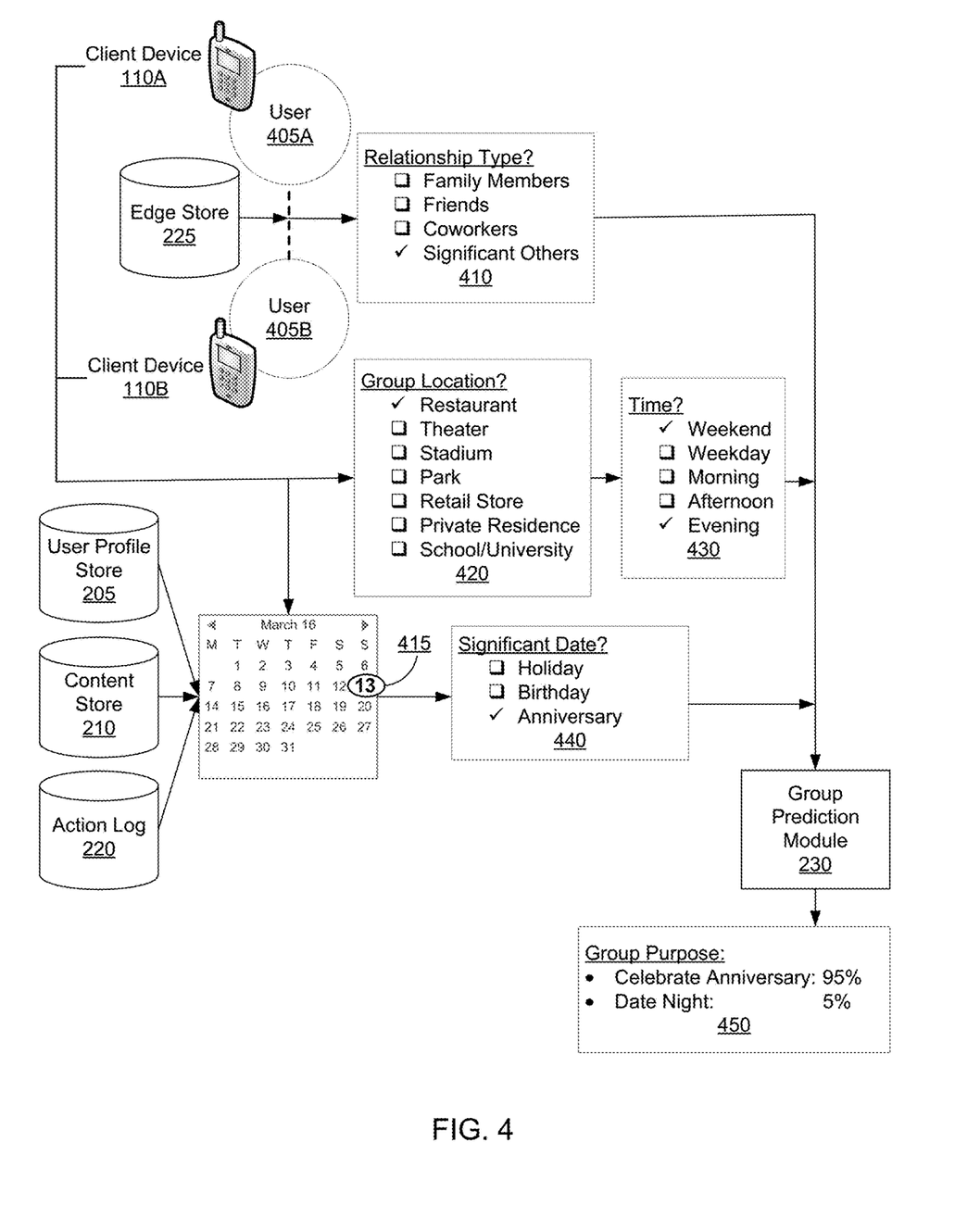
FIG. 4 is a conceptual diagram of predicting a purpose of a group of users of an online system, in accordance with an embodiment.

FIG. 4 depicts a conceptual diagram of predicting a purpose of a group of users of an online system 140. For a group of users 405A-B of the online system 140, the group prediction module 230 may predict 310 the purpose 450 of the group based on information stored in association with a connection between the users 405A-B indicating a type of relationship 410 between the users 405A-B, information describing a location 420 of the group, and contextual information describing a time 430 or date 440 during which the group is meeting. For example, the group prediction module 230 retrieves information stored in association with connections between a group of two users 405A-B from the edge store 225 to determine that of the possible types of relationships 410 between the users 405A-B (e.g., family members, friends, coworkers, or significant others), that the users 405A-B are significant others. In the previous example, the group prediction module 230 also uses information received from the client devices 110A-B of the users 405A-B to determine that of the possible locations 420 of the users 405A-B (e.g., a restaurant, a theater, a stadium, a park, a retail store, a private residence, or a school or university), that the users 405A-B are at a restaurant and that of the possible times 430 during which the group is meeting (e.g., weekend or weekday or morning, afternoon, or evening), that the group is meeting during an evening on a weekend on Mar. 13, 2016 415.

The group prediction module 230 may also retrieve contextual information from the user profile store 205, the content store 210, and/or the action log 220 to determine whether any significant dates 440 specific to the users 405A-B may be approaching (e.g., holidays, birthdays or anniversaries). For example, the group prediction module 230 retrieves profile information of the users 405A-B of the group indicating the users' hometowns, birthdays, and the date the user's relationship began (e.g., Mar. 13, 2015), and information describing content recently posted by the users 405A-B (e.g., content tagged with the keyword "anniversary") and actions recently performed by the users 405A-B (e.g., checking-in to a florist). Based on information indicating a type of relationship between the users 405A-B of the group, the location of the group, and contextual information associated with the group, the group prediction module 230 predicts 310 that two possible purposes 450 of the group are to celebrate the couple's anniversary and to go on a date night. Here, the group prediction module 230 also computes values indicating confidence levels associated with the predicted purposes 450 of the group (i.e., 95% for celebrating an anniversary and 5% for date night).

Referring again to FIG. 3, the group prediction module 230 may also predict 315 one or more common interests shared by users of the group. Common interests of users of the group may be predicted 315 based on information maintained by the online system 140 associated with the users, such as historical interactions of the users with content maintained by the online system 140. For example, the group prediction module 230 may predict 315 one or more common interests shared by a group of users based on content for which the users previously expressed a preference, based on content the users previously shared with additional online system users, and/or based on content on which the users previously commented. One or more common interests of users of the group may also be predicted 315 by the group prediction module 230 based on profile information associated with the users. For example, if information stored in the user profile store 205 indicates that users of a group have hobbies that include snowboarding and information stored in the action log 220 includes information indicating that the users have previously expressed a preference for and/or shared content associated with snowboarding, the group prediction module 230 predicts 315 that a common interest shared by users of the group is snowboarding. A common interest shared by users of the group may be predicted 315 by a machine-learned model. In the previous example, if a machine-learned model is trained based on information indicating that users who have an interest in snowboarding are likely to also have an interest in skateboarding, the machine-learned model predicts 315 that common interests of users of the group also include skateboarding. The group prediction module 230 may also compute a value indicating a confidence level with which the common interest of users of the group was predicted. For example, a value indicating a confidence level of a prediction that a common interest of users of a group is scuba diving is higher if the prediction is based on profile information explicitly shared by the users (e.g., interests or hobbies that include scuba diving) than if the prediction is based on a few content items related to scuba diving viewed by some of the users of the group.

Once the group prediction module 230 has made a prediction about the purpose of the group and a prediction about one or more common interests shared by users of the group, the content selection module 235 determines 320 candidate content items that may be presented to one or more users of the group. The candidate content items are determined 320 by mapping the purpose and common interest of the users of the group to content items that may be presented to one or more users of the group. The mapping may be based on targeting criteria describing users of the online system 140 to which the content items are likely to be relevant, or any other suitable information associated with the content items having at least a threshold similarity to the purpose and common interest of the group. For example, if the group prediction module 230 predicts 310 that the purpose of a group is to attend an auction for football memorabilia and also predicts 315 that the users of the group share a common interest in basketball and baseball, the content selection module 235 maps the interest and purpose to an advertisement for a sports museum targeted to users who are interested in sports history and to a content item tagged with the keywords "autographed baseball card." Each content item to which the purpose and common interest of the group are mapped is determined 320 to be a candidate content item by the content selection module 235.

In some embodiments, the mapping is based on one or more roles associated with users of the group. For example, if a group identified by the group prediction module 230 is a family and roles in the group include parents and children, an advertisement for a restaurant may be mapped to the interest and purpose of the parents based on their roles as parents (e.g., advertising kids meals and family-friendliness) and an additional advertisement for the restaurant may be mapped to the interest and purpose of the children based on their roles as children (e.g., advertising free toys with kids meals). As an additional example, if a group identified by the online system is a group of coworkers, roles in the group may include supervisors and employees. In the previous example, an advertisement for software may be mapped to the interest and purpose of the supervisors based on their roles as managers (e.g., advertising increased productivity) and an additional advertisement for the software may be mapped to the interest and purpose of the employees based on their roles as employees (e.g., advertising user-friendliness). In some embodiments, the content selection module 235 uses a machine-learned model to map the purpose and common interest of the group to content items. For example, if a machine-learned model is trained based on information indicating that male online system users almost never view a content item including a video about nail polish, the machine-learned model does not map the purpose and interest of groups including males to the content items related to nail polish.

The scoring module 240 computes 325 a confidence score for each candidate content item indicating a measure of likelihood that the candidate content item is relevant to the group. In one embodiment, the confidence score for a content item is computed 325 based on weights associated with different types of interests and different types of purposes associated with both the group and the content item. For example, the scoring module 240 computes 325 a confidence score for a content item that includes a photo of actors from a television show based on different weights associated with different interests in topics associated with the photo (e.g., the show, each actor, etc.) and different weights associated with different purposes relevant to the content item (e.g., watching a movie that is based on the show or that stars one or more of the actors), where the weights are provided by a user that posted the content item. The confidence score in the previous example may also be computed 325 based on different weights based on confidence levels of predicted interests of a user of the group in the different topics and a weight based on a confidence level of a predicted purpose of the group that corresponds to a purpose relevant to the content item. In some embodiments, the scoring module 240 computes a bid price for a content item (e.g., an advertisement) based on the confidence score for the content item. For example, the bid price for an advertisement is based on the confidence score computed 325 for the advertisement, where the bid price is obtained by multiplying the confidence score by a conversion factor that converts the confidence score into a dollar amount.

The content selection module 235 selects 330 one or more content items for presentation to one or more users of the group based on the confidence score and/or bid price. In one embodiment, the content selection module 235 ranks content items based on their associated confidence scores/bid prices and selects 330 one or more of the highest ranked content items for presentation to one or more users of the group. In an alternative embodiment, the content selection module 235 ranks content items based on their associated confidence scores/bid prices and selects 330 one or more content items associated with at least a threshold score/bid price for presentation to the group. In yet another embodiment, the content selection module 235 ranks both candidate content items not associated with bid prices and advertisements in a unified ranking based on bid prices associated with advertisements and confidence scores associated with candidate content items and selects 330 one or more content items and/or advertisements for presentation to one or more users of the group based on the unified ranking.

The user interface module 245 presents 335 the selected 330 content items to one or more users of the group via client devices 110 associated with each of the users of the group to which the content items are presented 335. The content items may be presented 335 in a feed of content items generated by the user interface module 245. In various embodiments, the user interface module 245 presents 335 content to one or more users of the group through a newsfeed including a plurality of content items selected 330 for presentation to the users. One or more advertisements may also be included in the feed. The user interface module 245 may also determine the order in which selected content items or advertisements are presented 335 via the feed. For example, if the content selection module 235 selects 330 three content items based on a ranking system, the user interface module 245 generates a feed of content items with the highest ranked content item in the most prominent position of the feed, the second highest ranked content item in the second most prominent position, and the third highest ranked content item in the third most prominent position. The interface generated by the user interface module 245 may also include a separate display area in which the selected content may be presented 335. For example, the selected 330 content items may be presented 335 in a pop-up window that overlays a newsfeed generated by the user interface module 245.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving information describing locations of client devices associated with a plurality of users of an online system;
    identifying a group of users of the online system based on one or more connections between the users maintained by the online system and the information describing locations of client devices associated with the users during a time interval, each user of the group associated with a client device having a location that is within a threshold distance of a location of a client device associated with each additional user of the group for at least a threshold amount of time, the threshold distance based on a type of geographic location associated with the users during the time interval, and each user of the group is directly connected to at least one additional user of the group via a connection maintained by the online system;
    predicting a purpose of the group based on information stored in association with the one or more connections between the users of the group and a geographic location associated with the users of the group during the time interval;
    predicting a common interest shared by the users of the group based at least in part on a comparison of historical interactions by each user of the group with content maintained by the online system and a comparison of user profile information maintained by the online system for each user of the group;
    determining a plurality of candidate content items that may be presented to one or more users of the group, each of the plurality of candidate content items associated with a purpose having at least a threshold measure of similarity to the predicted purpose of the group and associated with an interest having at least a threshold measure of similarity to the predicted common interest shared by the users of the group;
    computing a score for each of the plurality of candidate content items based at least in part on a measure of similarity of the purpose associated with the candidate content item to the predicted purpose of the group and a measure of similarity of the interest associated with the candidate content item to the predicted common interest shared by the users of the group;
    selecting one or more content items from the plurality of candidate content items for presentation to the one or more users of the group based at least in part on the scores; and
    transmitting the one or more content items to client devices associated with the one or more users of the group for presentation.

2. The method of claim 1, wherein a machine-learned model is used for one or more selected from a group consisting of: predicting the purpose of the group, predicting the common interest shared by the users of the group, determining the plurality of candidate content items that may be presented to the one or more users of the group, and any combination thereof.

3. The method of claim 1, wherein the score for each of the plurality of candidate content items is further based at least in part on one or more roles associated with the one or more users of the group in relation to the group.

4. The method of claim 1, wherein the score for each of the plurality of candidate content items is further based at least in part on a weight associated with one or more selected from a group consisting of: the predicted purpose of the group, the purpose associated with the candidate content item, the predicted common interest shared by users of the group, the interest associated with the candidate content item, and any combination thereof.

5. The method of claim 1, wherein the purpose is further based at least in part on one or more selected from a group consisting of: a specified time within a threshold amount of time of the time interval, a previous visit by one or more users of the group to a physical location within a threshold distance of the geographic location associated with the users during the time interval, a previous action performed by one or more users of the group on the online system, and any combination thereof.

6. The method of claim 1, wherein the one or more connections between the users are maintained by an additional online system.

7. The method of claim 1, wherein the plurality of candidate content items are determined based at least in part on one or more targeting criteria associated with each of the plurality of candidate content items.

8. The method of claim 1, wherein the purpose of the group is predicted from a predefined set of purposes.

9. The method of claim 1, wherein the information maintained by the online system associated with each user of the group comprises one or more selected from a group consisting of: profile information associated with each user of the group, one or more previous interactions by a user of the group with content maintained by the online system, the information stored in association with the one or more connections between the users of the group, and any combination thereof.

10. The method of claim 1, wherein selecting one or more content items from the plurality of candidate content items for presentation to the one or more users of the group comprises:
computing a bid price for each of the plurality of candidate content items based at least in part on the score corresponding to each of the plurality of candidate content items;
ranking the plurality of candidate content items based at least in part on the computed bid prices; and
selecting the one or more content items based at least in part on the ranking.

11. The method of claim 1, wherein the plurality of candidate content items comprises one or more advertisements.

12. A computer program product comprising a computer readable storage medium having instructions encoded thereon that, when executed by a processor, cause the processor to:
receive information describing locations of client devices associated with a plurality of users of an online system;
identify a group of users of the online system based at least in part on one or more connections between the users maintained by the online system and the information describing locations of client devices associated with the users during a time interval, each user of the group associated with a client device having a location that is within a threshold distance of a location of a client device associated with each additional user of the group for at least a threshold amount of time, the threshold distance based on a type of geographic location associated with the users during the time interval, and each user of the group is directly connected to at least one additional user of the group via a connection maintained by the online system;
predict a purpose of the group based on information stored in association with the one or more connections between the users of the group and a geographic location associated with the users of the group during the time interval;
predict a common interest shared by the users of the group based at least in part on a comparison of historical interactions by each user of the group with content maintained by the online system and a comparison of user profile information maintained by the online system for each user of the group;
determine a plurality of candidate content items that may be presented to one or more users of the group, each of the plurality of candidate content items associated with a purpose having at least a threshold measure of similarity to the predicted purpose of the group and associated with an interest having at least a threshold measure of similarity to the predicted common interest shared by the users of the group;
compute a score for each of the plurality of candidate content items based at least in part on a measure of similarity of the purpose associated with the candidate content item to the predicted purpose of the group and a measure of similarity of the interest associated with the candidate content item to the predicted common interest shared by the users of the group;
select one or more content items from the plurality of candidate content items for presentation to the one or more users of the group based at least in part on the scores; and
transmit the one or more content items to client devices associated with the one or more users of the group for presentation.

13. The computer program product of claim 12, wherein a machine-learned model is used for one or more selected from a group consisting of: predicting the purpose of the group, predicting the common interest shared by the users of the group, determining the plurality of candidate content items that may be presented to the one or more users of the group, and any combination thereof.

14. The computer program product of claim 12, wherein the score for each of the plurality of candidate content items is further based at least in part on one or more roles associated with the one or more users of the group in relation to the group.

15. The computer program product of claim 12, wherein the score for each of the plurality of candidate content items is further based at least in part on a weight associated with one or more selected from a group consisting of: the predicted purpose of the group, the purpose associated with the candidate content item, the predicted common interest shared by users of the group, the interest associated with the candidate content item, and any combination thereof.

16. The computer program product of claim 12, wherein the purpose is further based at least in part on one or more selected from a group consisting of: a specified time within a threshold amount of time of the time interval, a previous visit by one or more users of the group to a physical location within a threshold distance of the geographic location associated with the users during the time interval, a previous action performed by one or more users of the group on the online system, and any combination thereof.

17. The computer program product of claim 12, wherein the one or more connections between the users are maintained by an additional online system.

18. The computer program product of claim 12, wherein the plurality of candidate content items are determined based at least in part on one or more targeting criteria associated with each of the plurality of candidate content items.

19. The computer program product of claim 12, wherein the purpose of the group is predicted from a predefined set of purposes.

20. The computer program product of claim 12, wherein the information maintained by the online system associated with each user of the group comprises one or more selected from a group consisting of: profile information associated with each user of the group, one or more previous interactions by a user of the group with content maintained by the online system, the information stored in association with the one or more connections between the users of the group, and any combination thereof.

21. The computer program product of claim 12, wherein select one or more content items from the plurality of candidate content items for presentation to the one or more users of the group comprises:
compute a bid price for each of the plurality of candidate content items based at least in part on the score corresponding to each of the plurality of candidate content items;
rank the plurality of candidate content items based at least in part on the computed bid prices; and
select the one or more content items based at least in part on the ranking.

22. The computer program product of claim 12, wherein the plurality of candidate content items comprises one or more advertisements.

23. A method comprising:
identifying a group of users of an online system based at least in part on one or more connections between the users maintained by the online system and locations of client devices associated with the users during a time interval, wherein a location of a client device associated with each user of the group is within a threshold distance of a location of each client device associated with each additional user of the group for at least a threshold amount of time, the threshold distance based on a type of geographic location associated with the users during the time interval, and each user of the group is directly connected to at least one additional user of the group via a connection maintained by the online system;
predicting a purpose that is associated with the group, the purpose predicted from a predefined set of purposes based at least in part on information stored in association with the one or more connections between the users and a geographic location associated with the users during the time interval;
predicting a common interest shared by the users of the group based at least in part on a comparison of historical interactions by each user of the group with content maintained by the online system and a comparison of user profile information maintained by the online system for each user of the group;
determining a plurality of candidate content items that may be presented to one or more users of the group, each of the plurality of candidate content items associated with a purpose having at least a threshold measure of similarity to the predicted purpose of the group and an interest having at least a threshold measure of similarity to the predicted common interest shared by the users of the group;
computing a score for each of the plurality of candidate content items based at least in part on a measure of similarity of the purpose associated with the candidate content item to the predicted purpose of the group and a measure of similarity of the interest associated with the candidate content item to the predicted common interest shared by the users of the group;
ranking plurality of candidate content items based at least in part on the scores; and
selecting one or more content items from the plurality of candidate content items for presentation to the one or more users of the group based at least in part on the ranking.

* * * * *